US006637184B2

(12) United States Patent
Freeman

(10) Patent No.: US 6,637,184 B2
(45) Date of Patent: Oct. 28, 2003

(54) FLOW CONTROL SYSTEM FOR LIQUID FUEL ENGINE HAVING STAGE-SPECIFIC CONTROL OF FUEL FLOW TO SEVERAL GROUPS OF NOZZLES IN THE ENGINE

(75) Inventor: Michael Scott Freeman, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 79 days.

(21) Appl. No.: 10/056,142

(22) Filed: Jan. 24, 2002

(65) Prior Publication Data

US 2003/0136105 A1 Jul. 24, 2003

(51) Int. Cl.[7] .............................. F02C 9/00; F02G 3/00
(52) U.S. Cl. ...................... 60/39.281; 60/773; 60/746
(58) Field of Search ............................ 60/39.281, 773, 60/746

(56) References Cited

U.S. PATENT DOCUMENTS

| 3,908,360 A | | 9/1975 | Meyer |
| 4,004,412 A | | 1/1977 | Burnell |
| 4,697,238 A | | 9/1987 | Barbeau |
| 4,815,278 A | | 3/1989 | White |
| 5,252,860 A | | 10/1993 | McCarty et al. |
| 5,349,811 A | * | 9/1994 | Stickler et al. ............... 60/776 |
| 5,365,732 A | * | 11/1994 | Correa ................... 60/39.281 |
| 5,369,948 A | | 12/1994 | Vertens et al. |
| 5,423,175 A | * | 6/1995 | Beebe et al. .............. 60/39.281 |
| 6,209,310 B1 | * | 4/2001 | Kuenzi et al. ................. 60/775 |
| 6,522,991 B2 | * | 2/2003 | Banaszuk et al. ........... 702/138 |
| 2001/0023578 A1 | * | 9/2001 | Braun et al. ................ 60/39.03 |
| 2002/0033014 A1 | * | 3/2002 | Endo et al. .............. 60/39.281 |
| 2002/0038540 A1 | * | 4/2002 | Griffiths et al. .......... 60/39.281 |

FOREIGN PATENT DOCUMENTS

EP 0425835 5/1991

* cited by examiner

Primary Examiner—Ehud Gartenberg
Assistant Examiner—William H. Rodriguez

(57) ABSTRACT

A fuel flow control system for directing fuel within a combustion engine having a plurality of fuel introduction nozzles arranged in a plurality of operationally-distinct groups is disclosed. The system includes a plurality of pumping assemblies each corresponding to one of the nozzle groups. Each pumping assembly includes several fuel motivation elements, each in fluid communication with a fuel supply and a corresponding one of said nozzles. Drive elements, such as variable speed motors, are operatively associated with the pumping assemblies, and direct the motivation elements to transmit fuel to the nozzles. A control assembly independently controls the drive elements, so that fuel flow to each nozzle group is independently controllable. In one embodiment, the motivation elements in each pumping assembly are mechanically linked and operate as discrete groups of elements, thereby delivering uniform fuel flow to each nozzle within a given group of nozzles.

11 Claims, 1 Drawing Sheet

FLOW CONTROL SYSTEM FOR LIQUID FUEL ENGINE HAVING STAGE-SPECIFIC CONTROL OF FUEL FLOW TO SEVERAL GROUPS OF NOZZLES IN THE ENGINE

FIELD OF THE INVENTION

This invention relates generally to the field of internal combustion engines and, more particularly, to fuel flow systems for gas turbine engines.

BACKGROUND OF THE INVENTION

Combustion engines are machines that convert chemical energy stored in fuel into mechanical energy useful for generating electricity, producing thrust, or otherwise doing work. These engines typically include several cooperative sections that contribute in some way to the energy conversion process. In gas turbine engines, air discharged from a compressor section and fuel introduced from a fuel supply are mixed together and burned in a combustion section. The products of combustion are harnessed and directed through a turbine section, where they expand and turn a central rotor. In turbo-jet engines, the primary resultant motive force is thrust. In turbo-shaft engines, the rotor produces shaft horsepower or torque. The output shaft may, in turn, be linked to devices such as an electric generator to produce electricity. In these cases, fuel flow to the engine is essential to meet performance parameters of the engine.

Factors including the location, manner, and flow rate of fuel introduction will impact the engine performance in a variety of ways. For example, varying the fuel flow can adjust the power produced by the engine, may impact the combustion stability of the engine, will often determine the vibration and acoustic properties of the engine, and can even determine the amount and type of emissions produced.

One industry where internal combustion engines are utilized is power generation, where gas turbines are used to produce electricity. In this industry, consistent performance and low emissions production is essential. The proper control of fuel flow and energy conversion capacity are both very important. To this end, gas turbine engines often employ multiple combustor assemblies placed in an annular arrangement around a central axis, with each combustor including several fuel injection nozzles. The nozzles are typically arranged in several discrete, individually-controlled groups, often called stages or zones. With this multi-stage arrangement, various stability, dynamics, and emissions concerns may be addressed. For example, by controlling fuel flow to different stages or groups of nozzles at varying rates or times, resonance tendencies may be cancelled, keeping engine acoustics and pressure oscillations at acceptable levels. Additionally, in an engine having independently controlled combustion stages, the associated groups of nozzles may be discretely positioned within the combustor, and each group of nozzles may supply fuel at a different rate of flow. As a result, nozzles at one location may provide a stabilizing pilot flame, while others may distribute fuel into regions of varying and controlled stoichiometry. This allows more finite control of turbine power, combustor stability, and engine emissions. Several arrangements of components have been developed to produce this fuel distribution.

In "staged" fuel flow or combustion arrangements, a main fuel pump transfers fuel from a fuel supply into several flow lines, with each line transmitting fuel to a different group of nozzles or combustion stages disposed within the combustors of the associated engine. Each combustion stage has different flow requirements; therefore, the piping associated with each stage incorporates a throttle valve that controls its associated fuel flow. Downstream of each throttle valve, a flow divider splits the needed fuel flow so that each nozzle associated with a combustion stage receives controlled, identical fuel rates. This system provides equal flows to each combustor within a given engine, and allows for independent control of uniform fuel flow to each stage or group, but is not desirable in all situations. For example, this arrangement incorporates a large number of loss-producing components and is hydraulically inefficient. Additionally, due to changes in throttle valve performance at various flow rates, this arrangement provides varying degrees of control as flow requirements change over use.

Other fuel flow arrangements are also known. For example, Burnell (U.S. Pat. No. 4,004,412) shows a fuel flow system useful for directing fuel to an aircraft engine having one combustor. The fuel flow control system utilizes a variable-speed, motor-driven pump to transmit fuel to injection nozzles within the engine. This arrangement is often not suitable for use in a multi-combustor system and does not provide any guidance for directing different amounts of fuel to different regions within a combustor. While this type of system is suitable for some situations, it has a limited ability to control engine emissions, combustion stability, and the like, and may produce undesirable results in industries, such as is power generation, where emissions, reliability, and dispatch availability are critical.

Engine performance has, among other things, a direct correlation to overall plant emissions, efficiency, power output, and reliability. Accordingly, a need exists in the art for a hydraulically efficient fluid flow control system that produces controlled fuel flow rates to multi-stage combustion engines without the need for throttle valves, flow dividers, or fuel return loops. The system should provide uniform fuel flows to each nozzle within a given group of nozzles, irregardless of combustor association. The system should also allow independent control of fuel flow to each combustion stage within a given engine, to address combustor dynamics, engine stability, and emissions output issues.

SUMMARY OF THE INVENTION

The present invention is a fuel control system for a combustion engine having a plurality of combustors and a plurality of nozzles arranged into operatively-distinct groups, called stages. The system includes several variable-speed pumping assemblies each associated with one of the combustion nozzle stages. The pumping assemblies include motivation elements that each, in turn, correspond to one of the nozzles in the corresponding stage (or an entire combustor in single-stage systems). The motivation elements are positive displacement devices which preferably identical and coupled together. This ensures that each element rotates at the same speed, thereby delivering uniform, controlled fuel flow rates to each combustion stage, across the plurality of combustors connected to a given pumping assembly. Variable speed motors connected to the pumping assemblies act as drive elements that direct the motivation elements within each pumping assembly to delivery and meter fuel to the associated nozzles. The drive elements are independently controlled by a scheduling computer which may control the drive elements in response to desired operational conditions of the combustors. It is noted that variable speed drives need not be used; variable frequency drives turning a motor. The drive device could also be a turbine or similar arrangement.

Accordingly, it is an object of the present invention to provide a fuel flow control system that produces efficient flows of fuel to multi-stage, multi-combustor combustion engines, without the need for throttle valves or flow dividers.

It is an additional object of the present invention to provide a fuel flow control system that produces uniform fuel flows to each nozzle within a given combustion stage, irregardless of combustor association.

It is yet a further object of the present invention to provide a fuel flow control system that allows independent control of fuel flow to each of several nozzles stages within a given engine, to address combustor dynamics, engine stability, and emissions output issues.

Other objects and advantages of this invention will become apparent from the following description taken in conjunction with the accompanying drawings wherein are set forth, by way of illustration and example, certain embodiments of this invention. The drawings constitute part of this specification and include exemplary embodiments of the present invention and illustrate various objects and features thereof.

DETAILED DESCRIPTION OF THE INVENTION

Figure 1:
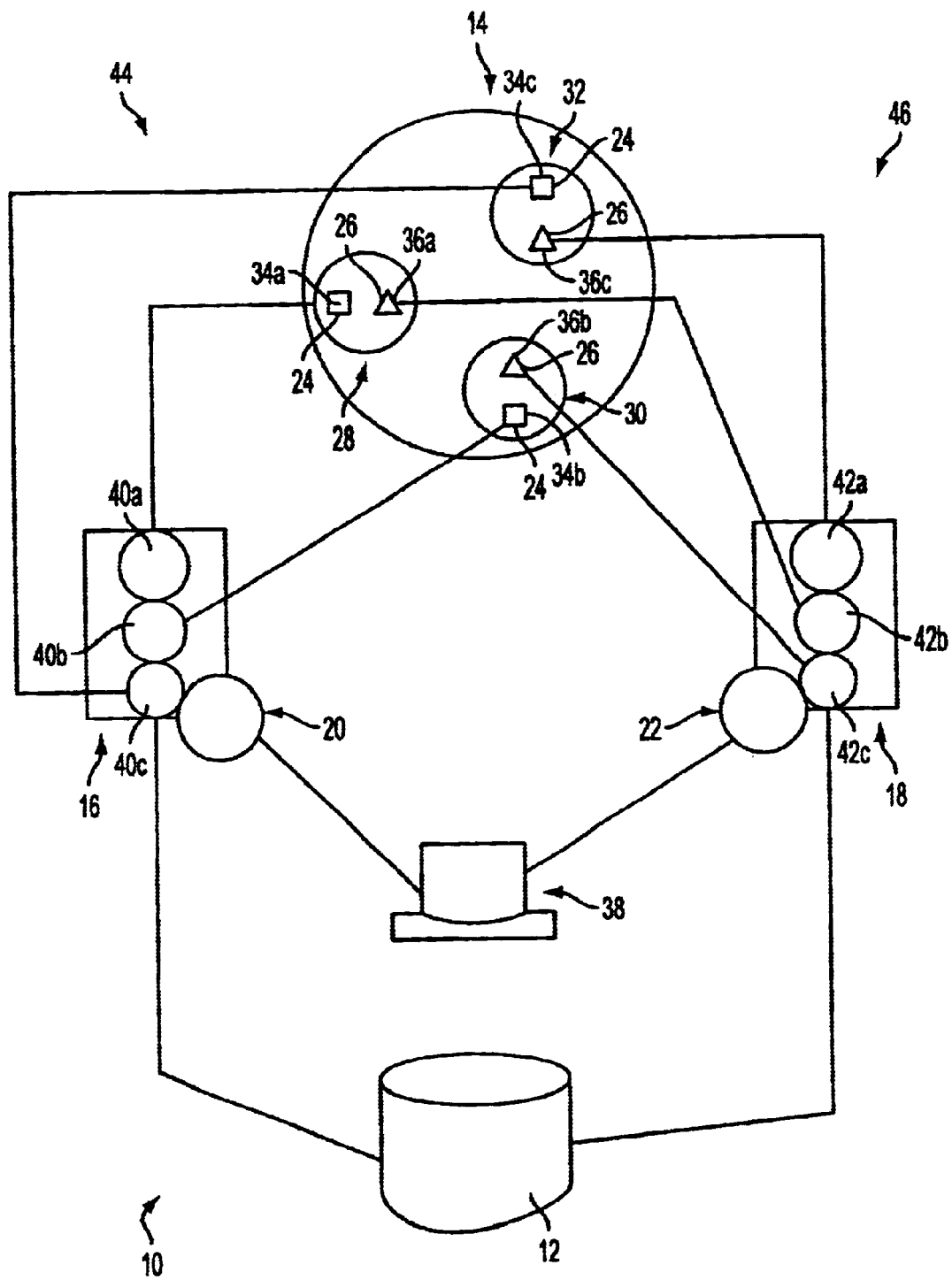
FIG. 1 is a schematic representation of the fluid flow control system of the present invention.

Reference is made to the FIG. 1, wherein a fuel flow control system 10 according to the present invention is shown. By way of overview, as shown in FIG. 1, the fuel flow control system 10 of the present invention includes several groups of cooperative elements that uniformly meter fuel from a fuel supply 12 to fuel distribution nozzles 34a,34b,34c and 36a,36b,36c disposed within several combustor assemblies 28,30,32 located within an associated gas turbine engine 14. The fuel distribution nozzles 34a,34b,34c and 36a,36b,36c are arranged into operationally-distinct nozzle groups or "stages" 24,26 within the combustor assemblies 28,30,32. These stages typically each have distinct characteristics relating to stoichiometry, flame temperature, or water injection rates, for example. In one arrangement, one of the stages acts as a "pilot" stage and the other stage acts as a "premixed" or maintenance stage. Fuel reaches each group of nozzles 24,26 through one of two dedicated pathways or branches 44,46 that feed the combustor assemblies 28,30,32. Both of the branches 44,46 are essentially identical, but each of the two branches supplies fuel to a different combustion stage or group of nozzles 24,26. Each branch 44,46 includes a pumping assembly 16,18 that transmits fuel to the corresponding combustor nozzle stage 24,26, and the pumping assemblies are each controlled by an associated variable-speed drive motor 20,22. A scheduling computer 38 separately controls each of the drive motors 20,22, thereby permitting the pumping assemblies 16,18 to operate independently. With this arrangement, the system 10 of the present invention allows stage-specific control of fuel flow to several groups 24,26 of nozzles in the engine 14, without the need for fuel return lines, throttle valves, flow dividers, or other similar components detrimental to the hydraulic efficiency of the fuel system. The flow control system 10 of the present invention will now be discussed in more detail, below.

With continued reference to FIG. 1, the flow control system 10 includes a first branch 44 that supplies fuel to the first stage 24 of nozzles and a second branch 46 which supplies fuel to the second stage 26 nozzles. All of the nozzles 34a,34b,34c in the first nozzle group 24 are identical and receive fuel uniformly, while all of the nozzles 36a,36b, 36c in the second nozzle group 26 are identical and also receive fuel uniformly. Although the nozzles 34a,34b,34c and 36a,36b,36c within a given stage 24,26 receive fuel uniformly, the nozzles of each stage are operationally distinct, and each stage may advantageously transmit fuel at a different rate. This arrangement allows the flow control system 10 of the present invention to provide intra-stage fuel flow uniformity, while allowing independent control of each stage. This results in a staged flow control system 10 that can address emissions control issues, while allowing the flexibility to direct fuel to the combustor assemblies 28,30,32 in a manner that avoids combustion instabilities.

With continued reference to FIG. 1, the first pumping assembly 16 is preferably a coupled-element fuel pump arrangement that includes three mechanically-linked, positive-displacement pumping elements 40a,40b,40c, with each pumping element sending fuel to a corresponding fuel nozzle 34a,34b,34c within the first nozzle group 24. All of the pumping elements 40a,40b,40c of the first pumping assembly 16 are preferably identical, thereby ensuring uniform fuel distribution from each pumping element as each pumping cycle is completed. Additionally, because the pumping elements 40a,40b,40c are mechanically linked, their speed and subsequent fluid displacements are identical. This arrangement, in turn, produces uniform flows of fuel to each of the nozzles 32a,32b,32c connected downstream. The first pumping assembly 16 preferably cooperates with the first drive motor 20 to form an active pumping system. With the drive motor 20 operationally linked to the pumping assembly 16, the positive displacement elements 40a,40b, 40c create the pressure required to transmit the fuel needed by the nozzles 32a,32b,32c, while the motor 20 produces the necessary torque.

Similarly, with continued reference to FIG. 1, the second pumping assembly 18 is preferably a coupled-element fuel pump arrangement that includes three mechanically-linked, positive-displacement pumping elements 42a,42b,42c, with each pumping element sending fuel to a corresponding fuel nozzle 36a,36b,36c within the second nozzle group 26. All of the pumping elements 42a,42b,42c are preferably identical, thereby ensuring uniform fuel distribution from each pumping element as each pumping cycle is completed. Additionally, because the pumping elements 42a,42b,42c are mechanically linked, their speed and subsequent fluid displacements are identical. This arrangement, in turn, produces uniform flows of fuel to each of the nozzles 36a,36b, 36c which are connected downstream. The second pumping assembly 18 preferably cooperates with the second drive motor 22 to form an active pumping system. With the drive motor 22 operationally linked to the pumping assembly 18, the positive displacement elements 42a,42b,42c create the pressure required to transmit the fuel needed by the nozzles 34a,34b,34c, while the motor 22 produces the necessary torque.

As discussed above, the flow control system 10 of the present invention employs a scheduling computer 38 which receives information about fuel flow requirements for the various stages within the combustor assemblies 28,30,32 and produces control signals that adjust the operation of each motor 20,22 accordingly. That is, the scheduling computer 38 can monitor several aspects of performance including, but not limited, to combustion dynamics, emissions output, and power requirements. In this manner, the scheduling computer 38 can advantageously modify fuel flow to each nozzle group 24,26, as needed to allow the various flow rates required by each nozzle group at different modes of engine operation, including start up, partial load, base load, and so on. Additionally, the fuel control system 10 of the present invention allows control of emissions and combustion stability by directing appropriate fractions of fuel to each of the nozzle groups 24,26 within the combustors.

It is noted that while three combustor assemblies 28,30,32 are shown in the present example, other numbers of combustor assemblies may be used. If a different number of combustor assemblies 28,30,32 are present in the associated engine 14, then a different number of pumping elements 40a,40b,40c and 42a,42b,42c would be required, so as to provide a pumping element dedicated to each nozzle. Additionally, although the combustor assemblies 28,30,32 have been shown as having only one nozzle 34a,34b,34c and 36a,36b,36c for each stage 24,26, it is noted that more than one nozzle in a given combustor assembly may be associated with a particular nozzle stage. In this situation, the number of pumping elements 40a,40b,40c and 42a,42b,42c would change accordingly, so that the number of pumping elements in each pumping assembly 16,18 would correspond to the number of nozzles 34a,34b,34c and 36a,36b,36c in the nozzle stage 24,26 fed by the pumping assembly.

Additionally, while the fuel flow control system 10 of the present invention is shown in use with three combustion assemblies 28,30,32 each having two nozzle stages 24,26, it is noted that a different number of stages may be employed within each combustor, in accordance with flow characteristics desired for the engine 14. It is noted that if the number of stages 24,26 changes, the number of branches 44,46 will change accordingly. Furthermore, the number of pumping assemblies 16,18 and drive motors 20,22 preferably corresponds to the number of stages 24,26 present in the combustor assemblies 28,30,32 to which fuel is being supplied. It is also recognized that the variable speed drive motors are not required to motivate the pumping assemblies; other devices such as air turbines, DC motors, or other variable devices may also be used if desired.

It is to be understood that while certain forms of the invention have been illustrated and described, it is not to be limited to the specific forms or arrangement of parts herein described and shown. It will be apparent to those skilled in the art that various, including modifications, rearrangements and substitutions, may be made without departing from the scope of this invention and the invention is not to be considered limited to what is shown in the drawings and described in the specification. The scope if the invention is defined by the claims appended hereto.

What is claimed is:

1. A fuel flow control system for directing fuel from a fuel supply to a combustion engine, said engine including at least one combustor having a plurality of fuel introduction nozzles arranged in a plurality of operationally-distinct groups, said control system comprising:

a plurality of pumping assemblies each constructed and arranged to provide fuel to a corresponding one of said nozzle groups, said assemblies including a plurality of fuel motivation elements each in fluid communication with a corresponding one of said nozzles, said assemblies being adapted for fluid communication with said fuel supply;

a plurality of adjustable drive elements each operatively associated with a corresponding one of said pumping assemblies, said drive elements being constructed and arranged to direct said motivation elements of said corresponding pumping assemblies; and a control assembly to control said drive elements, whereby fuel flow to each of said nozzle groups is independently controllable.

2. The fuel flow control system of claim 1, wherein said fuel motivation elements are operatively linked together, whereby fuel flow within each nozzle group is uniform.

3. The fuel flow control system of claim 2, wherein each of said pumping assemblies is a coupled element fuel pump arrangement.

4. The fuel flow control system of claim 3, wherein said motivation elements are positive displacement pumps.

5. The fuel flow control system of claim 4, wherein said positive displacement pumps are metering pumps.

6. The fuel flow control system of claim 4, wherein said drive elements are variable speed devices.

7. The fuel flow control system of claim 6, wherein said control assembly includes scheduling computer.

8. The fuel flow control system of claim 7, wherein said scheduling computer is adapted to receive input about an operational condition of said combustors and to control operation of said drive elements accordingly.

9. The fuel flow control system of claim 7, wherein said drive elements are independently controlled.

10. The fuel flow control system of claim 8, wherein the number of motivation elements in each of said pumping assemblies equals the number of nozzles included in the group associated with each pumping assembly.

11. The fuel flow control system of claim 1, wherein at least one of said nozzle groups includes more than one nozzle.

* * * * *